(12) United States Patent
Zak

(10) Patent No.: US 8,297,628 B2
(45) Date of Patent: Oct. 30, 2012

(54) WHEELED BUCKET

(75) Inventor: Zvi Zak, Herzlia (IL)

(73) Assignee: Keter Plastic Ltd., Herzelyia (IL)

( * ) Notice: Subject to any disclaimer, the term of this patent is extended or adjusted under 35 U.S.C. 154(b) by 255 days.

(21) Appl. No.: 11/327,445

(22) Filed: Jan. 9, 2006

(65) Prior Publication Data

US 2006/0175779 A1    Aug. 10, 2006

(30) Foreign Application Priority Data

Feb. 10, 2005   (IL) .......................................... 166817

(51) Int. Cl.
*B62D 39/00*   (2006.01)
*B62B 1/00*    (2006.01)

(52) U.S. Cl. ................. 280/33.998; 280/638; 280/47.26

(58) Field of Classification Search ............ 280/33.998, 280/47.26, 47.34, 47.131, 47.315, 655.1, 280/47.18, 87.01, 87.021, 47.31, 79.5, 79.7, 280/638

See application file for complete search history.

(56) References Cited

U.S. PATENT DOCUMENTS

| | | | | |
|---|---|---|---|---|
| 63,665 A * | 4/1867 | Stafford | | 280/47.31 |
| 307,455 A * | 11/1884 | Graves | | 280/47.31 |
| 1,014,475 A | 1/1912 | Holloway | | |
| 1,572,480 A | 2/1926 | Hislop | | |
| 1,819,601 A * | 8/1931 | Hiatt | | 280/47.26 |
| D131,210 S * | 1/1942 | Moreing | | D34/24 |
| 3,292,945 A | 12/1966 | Mitty et al. | | |
| 3,346,271 A | 10/1967 | Parsons | | |
| 3,425,709 A * | 2/1969 | Fields | | 280/79.2 |
| 4,261,596 A * | 4/1981 | Douglas | | 280/652 |
| 4,281,843 A * | 8/1981 | Johnson et al. | | 280/47.26 |
| 4,511,154 A * | 4/1985 | Daloisio | | 280/47.26 |
| 4,598,945 A * | 7/1986 | Hopkins | | 297/256.17 |
| 4,679,670 A * | 7/1987 | Wickman | | 190/18 A |
| 4,874,182 A * | 10/1989 | Clark | | 280/30 |
| 4,908,904 A | 3/1990 | Smith, Jr. | | |
| D315,757 S | 3/1991 | Klitsner | | |
| D327,350 S | 6/1992 | Brown et al. | | |
| D337,409 S | 7/1993 | Maple et al. | | |
| 5,433,463 A | 7/1995 | Finley | | |
| 5,445,397 A | 8/1995 | Evans | | |
| 5,474,483 A * | 12/1995 | Sun | | 446/71 |
| 5,489,000 A * | 2/1996 | Hillbohm | | 180/19.1 |
| D370,326 S | 5/1996 | Chapman et al. | | |
| D379,016 S | 4/1997 | Wilson | | |
| 5,615,903 A * | 4/1997 | Spear et al. | | 280/47.19 |
| 5,626,307 A * | 5/1997 | Smith | | 242/403.1 |
| 5,645,290 A * | 7/1997 | Gaffney et al. | | 280/33.998 |
| 5,671,933 A * | 9/1997 | Tucker | | 280/47.19 |
| D388,580 S | 12/1997 | Havlovitz | | |
| 5,692,761 A | 12/1997 | Havlovitz | | |

(Continued)

FOREIGN PATENT DOCUMENTS

DE    42 15 792    5/1992

(Continued)

*Primary Examiner* — J. Allen Shriver, II
*Assistant Examiner* — Bridget Avery
(74) *Attorney, Agent, or Firm* — Greenberg Traurig, LLP

(57) ABSTRACT

A bucket comprises generally vertical sidewalls and a bottom portion, defining together a bucket interior. The bucket further comprises a back face, constituting one of the sidewalls, which extends substantially above the height of the bucket interior. The bucket still further comprises at least two wheels mounted to the bucket at the back face about an axis at a bottom area thereof.

6 Claims, 12 Drawing Sheets

U.S. PATENT DOCUMENTS

| | | |
|---|---|---|
| D391,732 S | 3/1998 | Spear et al. |
| 5,758,886 A * | 6/1998 | Mayer .................. 280/47.26 |
| 5,918,343 A | 7/1999 | Young |
| 6,145,856 A | 11/2000 | Conti |
| 6,193,247 B1 * | 2/2001 | Spear et al. ........... 280/33.998 |
| 6,219,944 B1 | 4/2001 | Byers |
| 6,223,691 B1 * | 5/2001 | Beattie .................. 119/453 |
| 6,283,170 B1 | 9/2001 | Robinson |
| 6,550,860 B2 * | 4/2003 | Lombardi .............. 297/217.1 |
| 6,698,771 B1 | 3/2004 | Bergeron |
| D492,458 S | 6/2004 | Jarast |
| 6,761,366 B1 * | 7/2004 | Klemmensen et al. .... 280/47.26 |
| 6,848,695 B2 * | 2/2005 | Panasewicz et al. .... 280/33.998 |
| 7,107,934 B1 * | 9/2006 | Hanks ................... 119/170 |
| 2001/0045371 A1 * | 11/2001 | Ordonez ................. 206/499 |
| 2004/0075248 A1 | 4/2004 | Elden |
| 2004/0149761 A1 | 8/2004 | Smith |

FOREIGN PATENT DOCUMENTS

| | | |
|---|---|---|
| DE | 10 2004 031 059 A1 | 1/2006 |
| EP | 410 772 A2 | 1/1991 |
| WO | 00/33719 | 6/2000 |
| WO | 00/33719 A1 | 6/2000 |
| WO | 02/28726 A1 | 4/2002 |
| WO | 03/088803 | 10/2003 |
| WO | 03/088803 A1 | 10/2003 |

* cited by examiner

WHEELED BUCKET

FIELD OF THE INVENTION

This invention relates to a wheeled bucket, and, more particularly, to a bucket which can be used as a cart.

BACKGROUND OF THE INVENTION

The use of buckets, particularly those having wheels, is well known in the art. Their particular arrangement is useful for light- to medium-duty transport of items, for example, when engaged in gardening or other common home activities typically taking place outdoors. In addition, they have many indoor uses, especially as an easily portable vessel for water, such as to be used while cleaning floors and walls.

U.S. Pat. No. 5,433,463 discloses a bucketeer on wheels containing a bucket having a closed bottom, an open top, and an intermediate surrounding sidewall therebetween. It also comprises two handle brackets, each handle bracket having a flat first end and a hollow second end. Each flat end is secured to the surrounding sidewall of the bucket by a fastening means. A U-shaped handle has two extending arms. Each extending arm is received in one of each hollow second end of the two handle brackets. A back support has a flat first end, a second end, and an intermediate extent therebetween. The flat first end is secured to the surrounding side wall of the bucket by a fastening means. It further comprises a support extension having a first end and an off-set second end. The first end is secured to the intermediate extent. The off-set second end is secured to the closed bottom of the bucket. A back caster wheel is secured to the second end of the back support. An axle has two end portions and an intermediate extent therebetween. Two axle brackets are secured to the intermediate extent. Two wheels, each of which have an aperture therethrough, is provided. Each aperture of the two wheels is secured to the two end portions of the axle by a fastening means.

U.S. Pat. No. 6,283,170 discloses an ergonomic, liquid-transport container including a container body, a projecting lip extending from the front of the container body, a support member connected to the top of the container body, a lifting lever arm pivotally connected to the sides of the container body adjacent the back of the container body, a pair of non-caster wheels, connected to the container body adjacent the back, a pair of caster wheels, connected to the container body adjacent the front, and a storage compartment extending from the back. The container advantageously may be used in combination with a cleaning-tool wringer and a cleaning tool.

U.S. Pat. No. 6,698,771 discloses a wheeled caddy for washing a vehicle and for providing tools and supplies readily reachable for a user for that purpose. The wheeled caddy for washing a vehicle includes a base assembly including a base member being mounted upon a wheel assembly for movement upon a ground. It further includes a support member being mounted upon the base member and having an open top and a handle assembly including a handle holder member being securely attached to the support member, Additionally provided is a handle member being pivotally attached to the support member and a bucket being removably supported upon the support member. Cleaning accessory holders are securely attached to the support member for holding items used to wash a vehicle.

SUMMARY OF THE INVENTION

According to the present invention, there is provided a bucket comprising generally vertical sidewalls and a bottom portion, defining together a bucket interior, and an upper rim. A back face, constituting one of said sidewalls, extends above the height of the bucket interior. The bucket further comprises at least two wheels mounted to the bucket about an axis at a bottom portion thereof.

Optionally, the bucket comprises a recessed portion adjacent and perpendicular to the back face and the bottom portion, the recessed portion adapted to receive therein the wheels such that they do not extend beyond the back wall and bottom portion more than necessary to allow wheeling thereby of the bucket.

The back face comprises handle portions which, according to one embodiment, are a first aperture located near the top edge, and a second aperture located near the bucket interior.

The bucket is pivotable about the axis between a first position and a second position. In the first position, the bucket is disposed in an upright position so that the bottom portion faces downward, and in the second position the bucket is so called lying and disposed so that the back portion faces downward. The bucket may comprise an arrangement which function as support points therefor when in the second position. The wheels may constitute this arrangement.

The back face further comprises a top edge which allows for, while the bucket is in the second position, sliding transfer (e.g., by shoveling) of articles from the ground to the bucket via the back wall.

The bucket is further adapted for nested stacking, such that in the nested position, the back faces of nested buckets are adjacent and parallel to one another.

The bucket has a variety of indoor and outdoor uses. For example, it may be used to transport laundry or cleaning supplies, or as a mop bucket. Outdoors, it is particularly suited for use in a garden, e.g., toting soil or lawn debris, and may also be used for use at a construction site, for example, to transport tools or equipment thereto or debris therefrom. When used to contain water which will need to be discarded, such as after washing a car, the extended back face serves to direct the flow of water to a desired location, minimizing uncontrolled spillage of wastewater.

BRIEF DESCRIPTION OF THE DRAWINGS

In order to understand the invention and to see how it may be carried out in practice, several embodiments will now be described, by way of non-limiting example only, with reference to the accompanying drawings, in which.

DETAILED DESCRIPTION OF THE INVENTION

Figure 1:
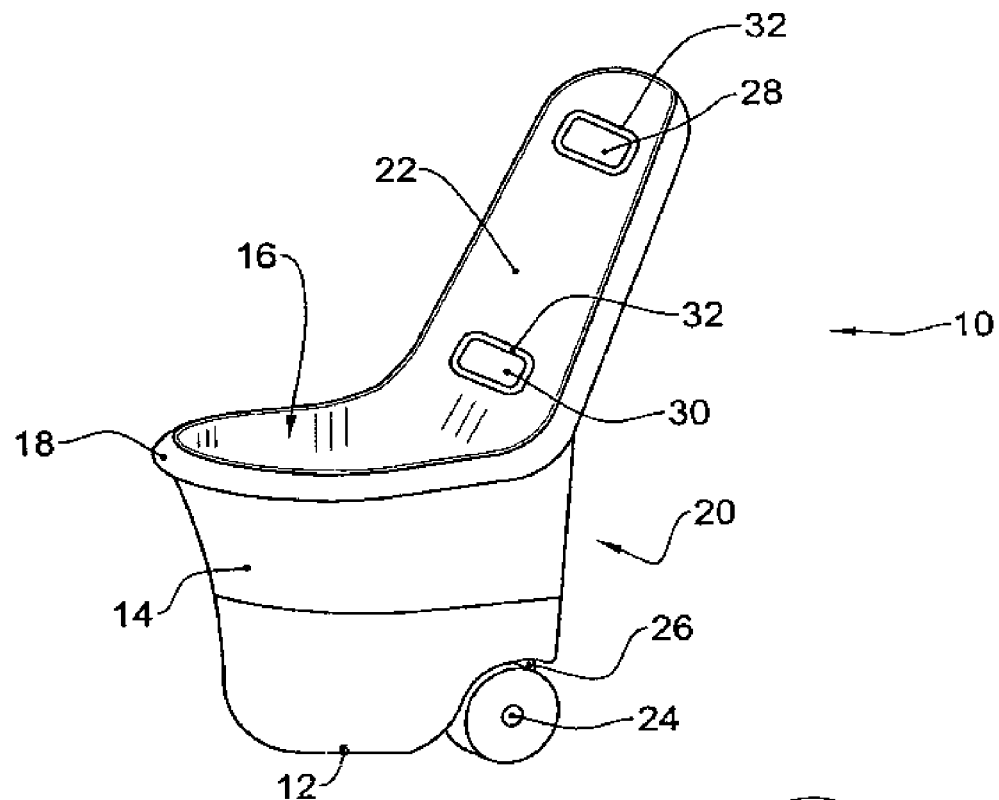
FIG. 1 is a perspective view of a bucket according to one embodiment of the present invention.

As seen in FIG. 1, there is provided a bucket, generally designated at 10. The bucket 10 is preferably made from a lightweight, sturdy material, such as high density polyethylene. It comprises a bottom portion 12, vertical sidewalls 14 extending upwardly therefrom and defining a bucket interior 16, and an upper rim 18, which is a downwardly curved extension of the top of the sidewalls. The bucket 10 further comprises, at a back face 20 thereof, an upwardly extending portion 22, which is a smooth continuation of the sidewall 14 at the back face. The bucket 10 further comprises, adjacent the bottom portion 12 and the back face 20, two wheels 24.

Figure 2:
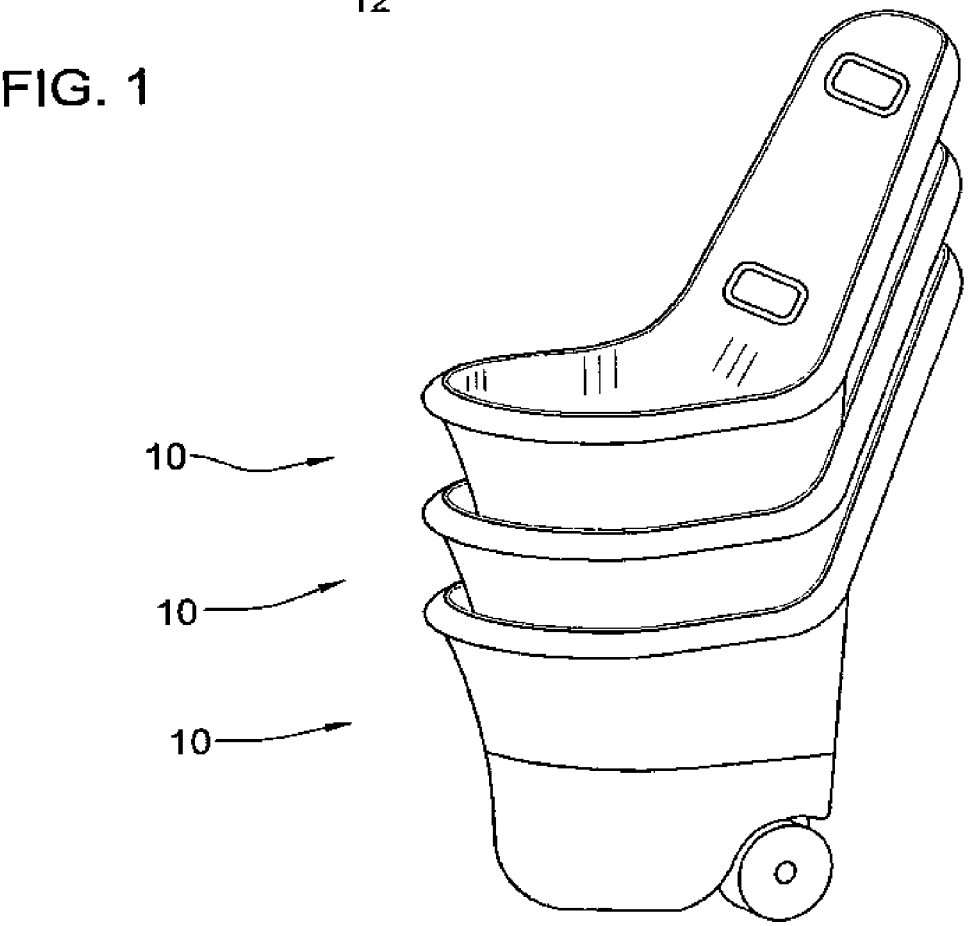
FIG. 2 is a perspective view of several buckets according to the present invention in a nested configuration.

The sidewalls 14 further comprise recesses 26 in the location of the wheels 24. The recesses 26 are sized so that the wheels 24 do not project beyond the bottom portion 12 or sidewalls 14, except as necessary for the bucket 10 to be rolled, so as not to interfere with the ability of the bucket 10 to nest with other identical buckets, as seen in FIG. 2.

The bucket 10 further comprises first and second apertures 28 and 30, constituting handles, formed in the upwardly extending portion 22. The first aperture 28 is disposed near the top of the upwardly extending portion 22, and the second aperture 30 is disposed near the top of the bucket interior 16. Each aperture 28, 30 is ringed by a handgrip 32 which sheathes the edges thereof. The handgrips 32 according to one embodiment are integrally formed with the bucket, and according to another embodiment may be made of a soft material such as rubber or solid foam, but may be of any appropriate material, and are adapted to provide for comfortable lifting of the bucket 10 thereby. Alternatively, the handgrips 32 may be made from metal, or any other suitable material.

As shown in FIG. 1-6, the bucket 10 comprises sidewalls 14 having a pre-determined height. The combined height of the rear sidewall 14 and upwardly extending portion 22 is about twice the height of the sidewalls 14 (e.g. more than twice the height of the sidewalls 14).

According to another embodiment, the rim 18 may extend along side edges 35 of the upwardly extending portion 22 and along a top edge 36 thereof. The rim 18 at the top edge 36 thereby constitutes a handle adapted to pull the bucket 10 thereby, as shown in FIG. 3A.

Figure 3A:
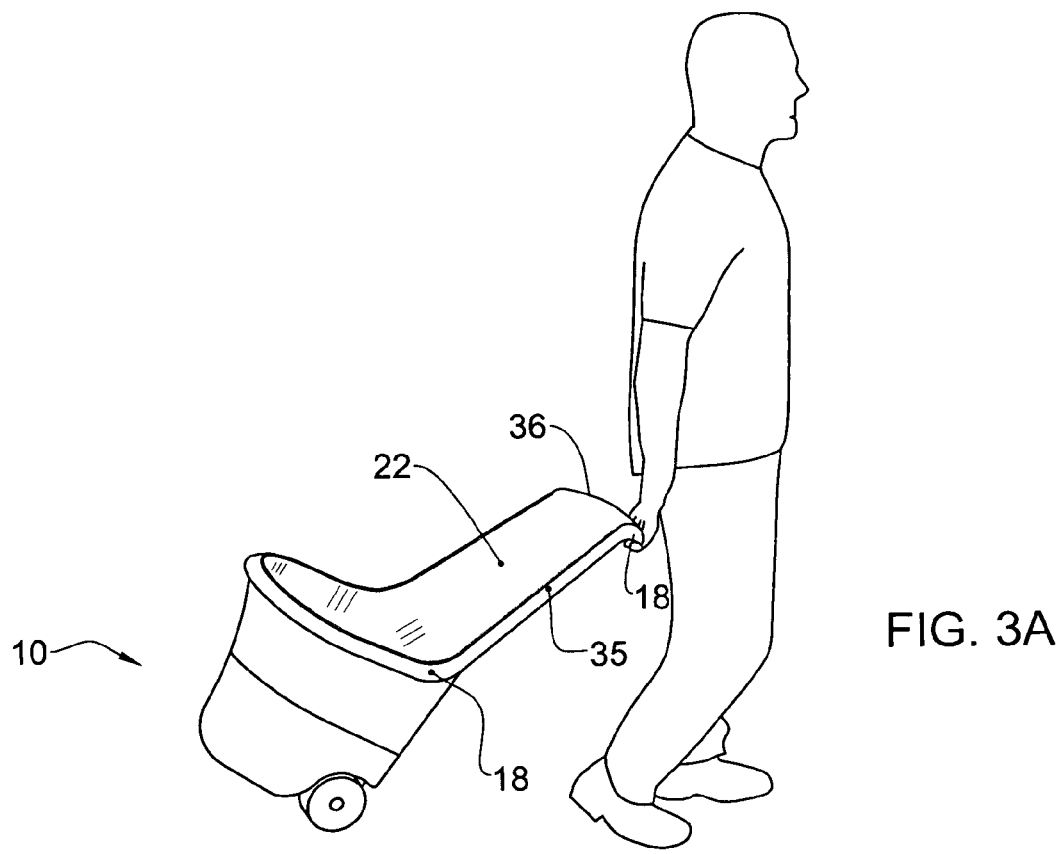
FIGS. 3A, 3B, 4 and 5 are perspective views illustrating different carrying positions and uses of the bucket of the present invention.
Figure 3B:
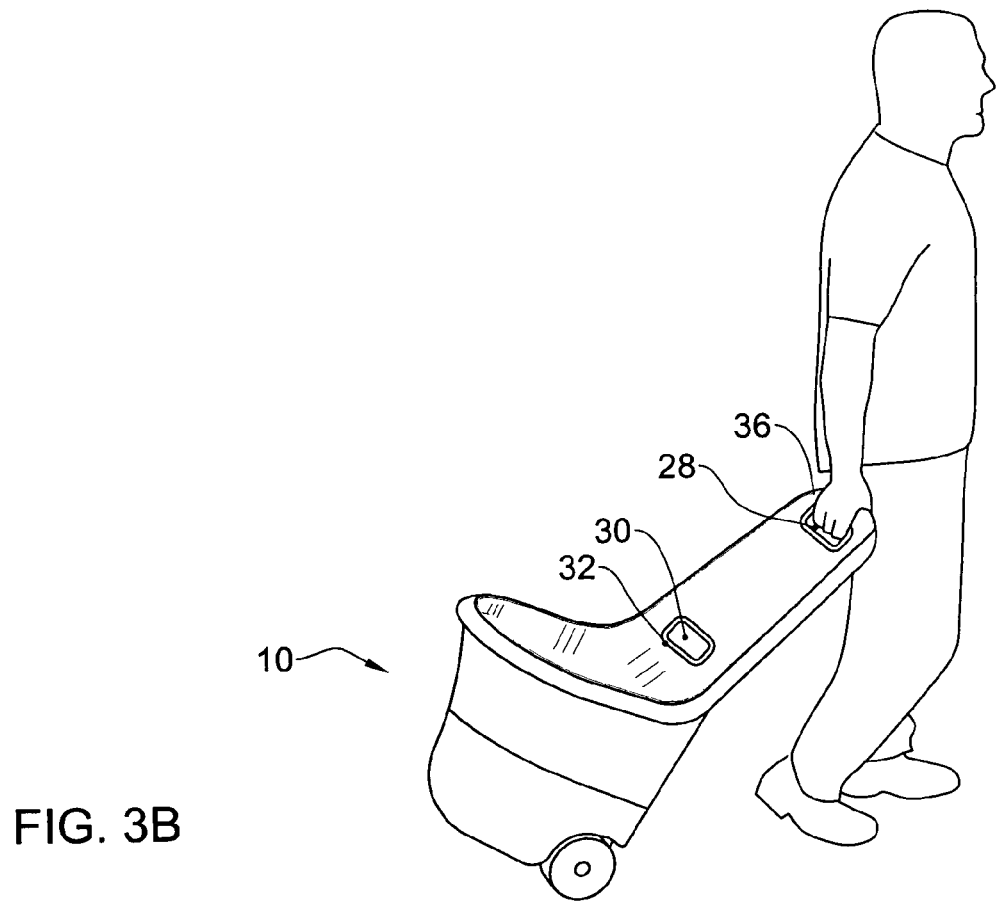

The upwardly extending portion 22 is preferably of such a height so to allow a user to grasp the first aperture 28 or the rim at the top edge 36 without having to stoop, as seen in FIGS. 3A and 3B. It should be noted that in addition to being pulled as shown, the bucket 10 may be pushed similar to a wheelbarrow.

Figure 4:
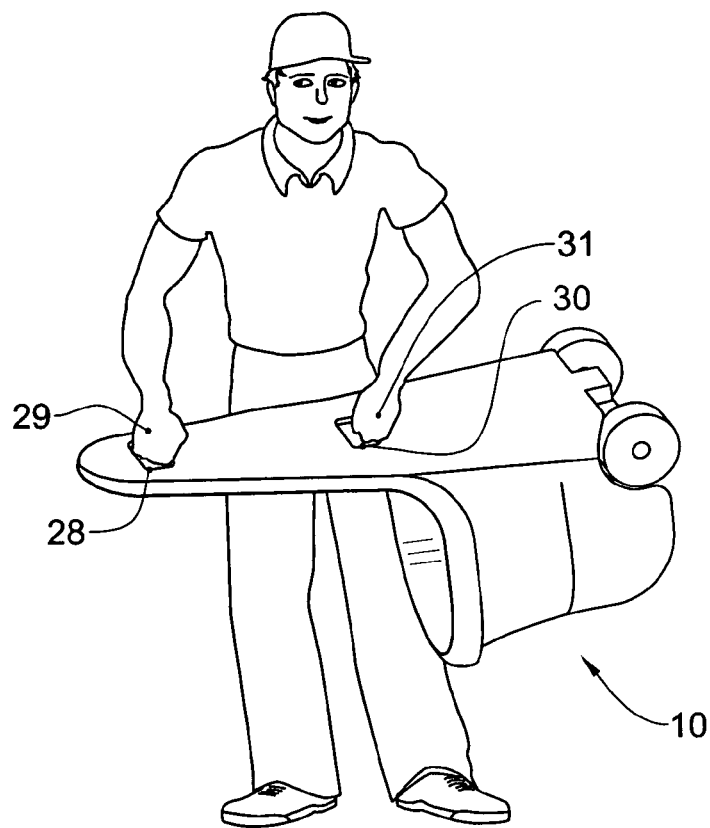
Figure 5:
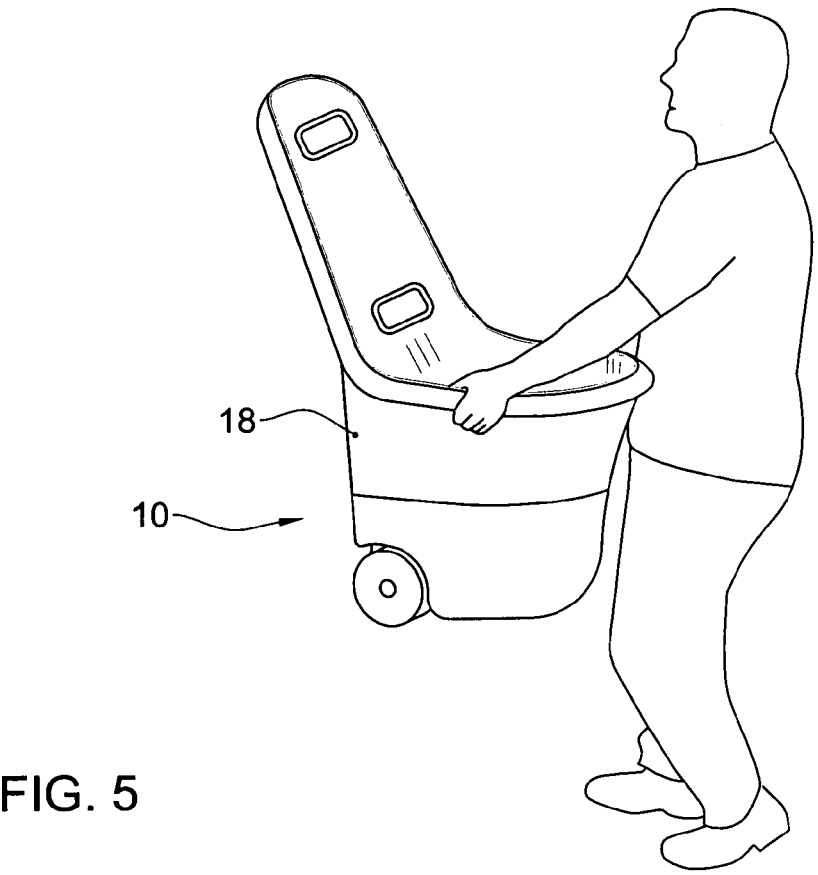

FIG. 4 shows the bucket 10 during use, wherein a user utilizes the apertures 28, 30 to at least partially invert the bucket. Specifically, the user grasps the first aperture 28 with a first hand 29 and the second aperture 30 with a second hand 31 and lifts the bucket 10 as shown. This position is useful for transporting the bucket 10 while empty, pouring out its contents, utilizing it as a scoop or a shovel, etc. In addition, the bucket 10 may be lifted by grasping the rim 18, as seen in FIG. 5. The bucket 10 may optionally comprise two side grips (not shown) to facilitate lifting by the rim. The grips may be made of the same material as the handgrips 32.

Figure 6:
FIG. 6 is a perspective view of the bucket illustrating a further use thereof.

The bucket 10 is adapted to pivot about the wheels 24 between a first position, as seen in FIG. 1, wherein the upwardly extending portion 22 is disposed substantially vertically, and a second position, as seen in FIG. 6, wherein the upwardly extending portion 22 is disposed substantially horizontally.

According to one particular design, the top edge 36 of the upwardly extending portion 22 is preferably designed so that at least a substantial portion lies flat against the ground when the bucket 10 is in the second position. In addition, the upwardly extending portion 22 may be substantially flat to allow it to lie flush with the ground. The wheels 24 are designed to serve as support points adapted to provide further stability to the bucket 10 in the second position.

When in the second position, the upwardly extending portion 22 constitutes a ramp via which the user may easily sweep or rake debris into the bucket 10, as seen in FIG. 6. In order to guide debris into the bucket interior 16, side portions 25 of the upwardly extending portion 22 are curved so that they follow the contour of the sidewalls 14, being elevated with respect to a center portion of the upwardly extending portion which lies on the ground, constituting side guards for the ramp. There may optionally be provided covers (not shown) which snappably attach to and obstruct the apertures 28, 30, so as to prevent loss of debris therethrough. When not is use, the covers may be stored on the bucket 10 in such a place so as not to interfere with normal operation thereof, such as the back of the upwardly extending portion 22.

Figure 7A:
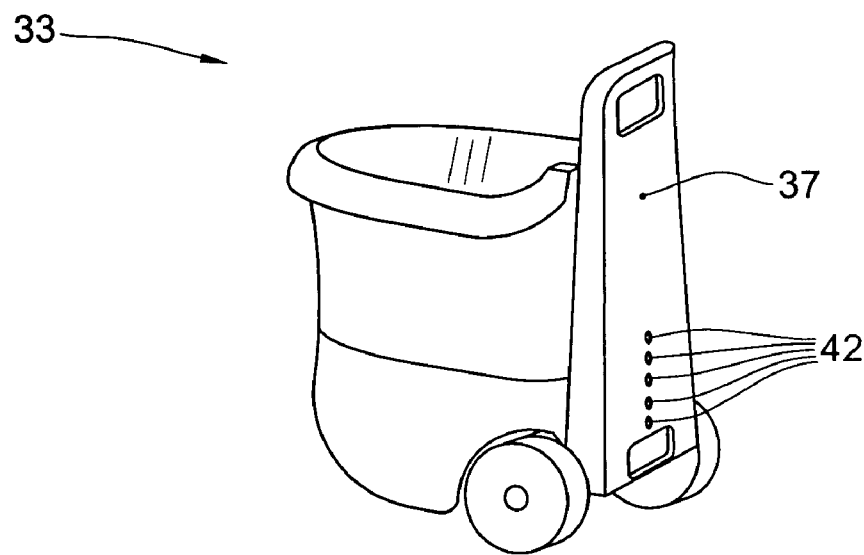
FIGS. 7A and 7B are perspective views of the bucket with a back face in a retracted and extended position, respectively, according to another embodiment of the present invention.
Figure 7B:
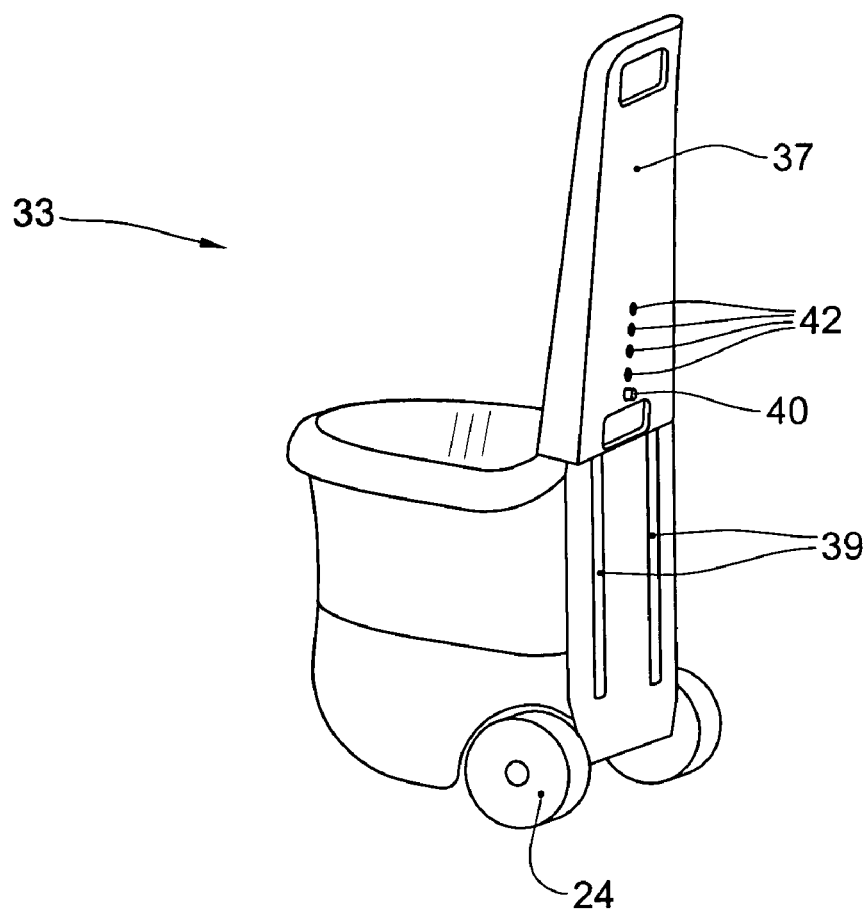

FIGS. 7A and 7B illustrate a modification of the bucket, generally designated 33, according to the present invention, wherein the upwardly extending portion 37 is extendable between a fully retracted position (as is FIG. 7A), in which the top edge 36 of the upwardly extending portion 22 is disposed near the top of the bucket interior 16, and a fully extended position (as seen in FIG. 7B). This may accomplished by providing rails 39 projecting from the back of the bucket 33, and complementary tracks (not seen) on the inside side of the upwardly extending portion 37. This allows for operation as described above, and for storage in small locations. The upwardly extending portion 22 may be arrested in one or more intermediate positions between the fully retracted and fully extended positions. For example, there may be a snap-arresting arrangement, or a spring-loaded pin 40 extending from the back face 20 of the bucket, and a series of apertures 42 disposed in the upwardly extending portion 22, adapted to receive the pin 40 at several arresting positions and arrest thereby the upwardly extending portion (as in FIG. 7B, the pin 40 shown received within an aperture 42).

As shown in FIG. 7A and 7B, the bucket 33 comprises sidewalls having a pre-determined height. The combined height of the rear sidewall and upwardly extending portion 37 is about twice the height of the sidewalls 14 when extended (e.g. more than twice the height of the sidewalls).

Figure 8A:
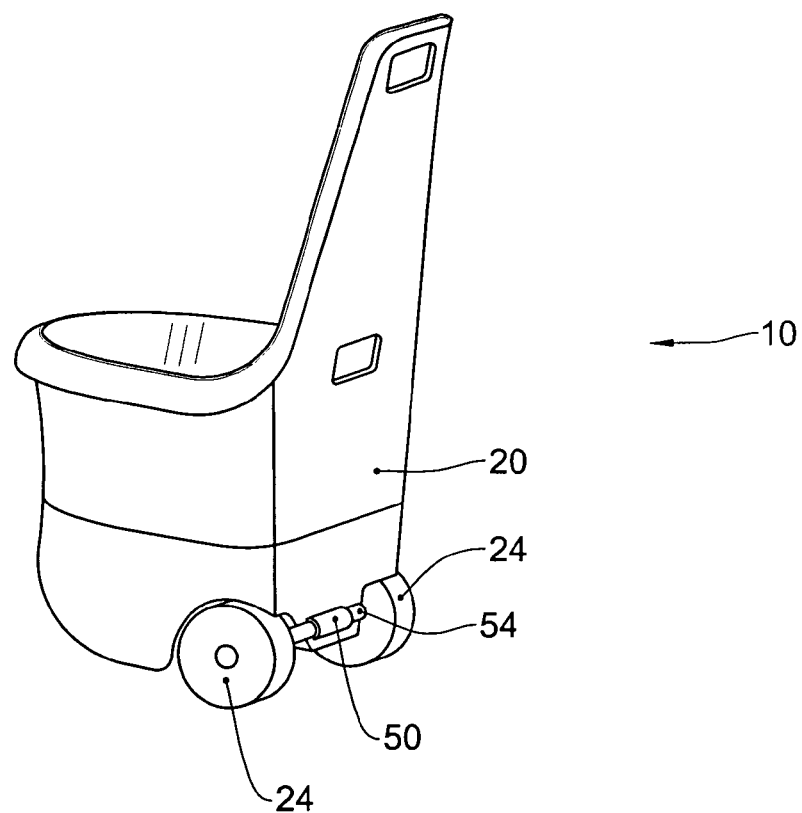
FIGS. 8A through 11 are perspective views showing further embodiments regarding placement of the axle (FIGS. 8B and 9 do not show the axle)
Figure 8B:
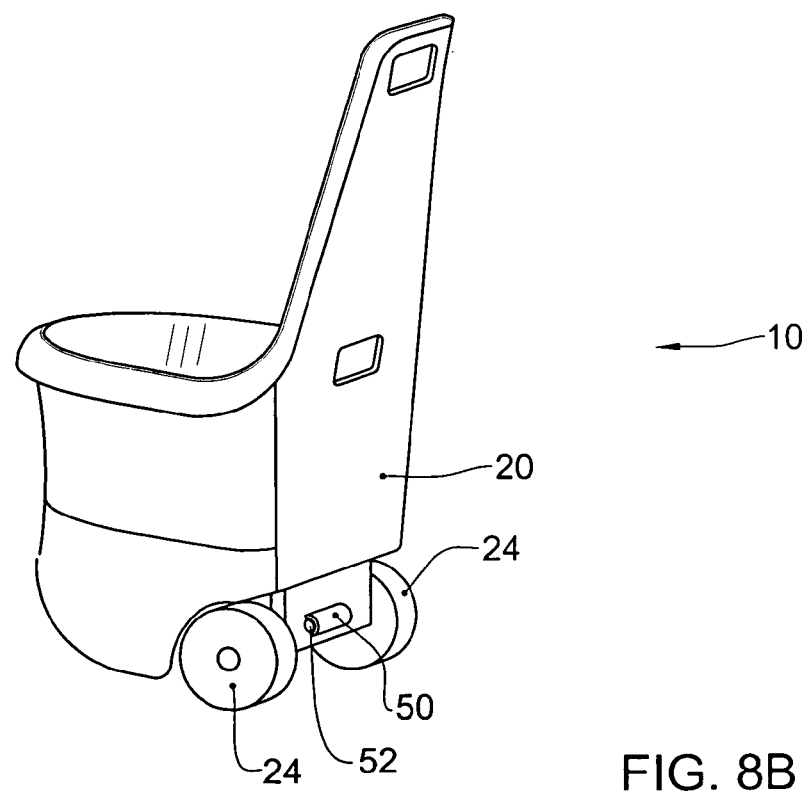
Figure 9:
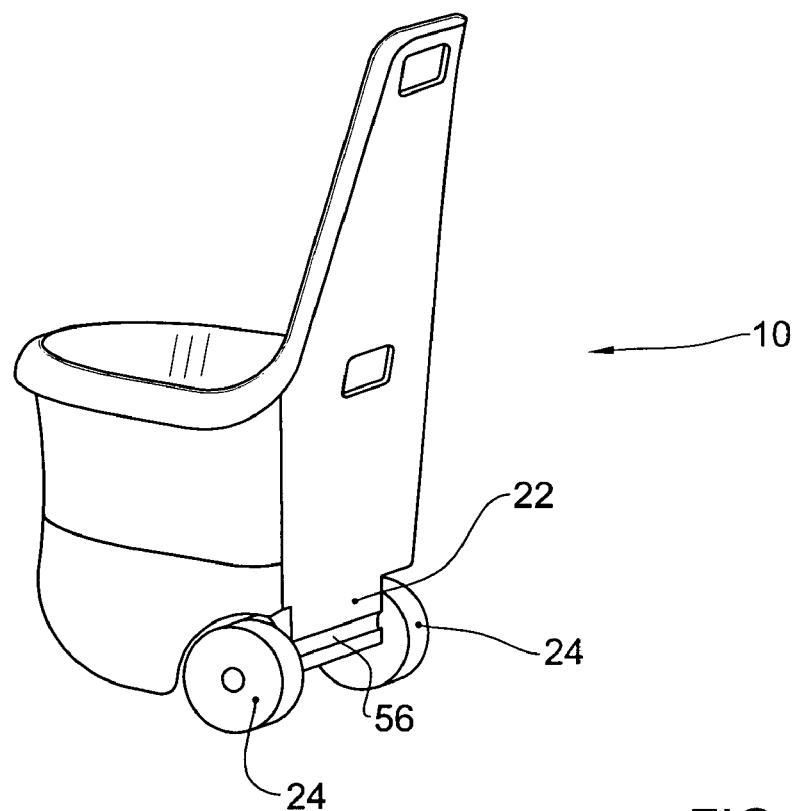
Figure 10:
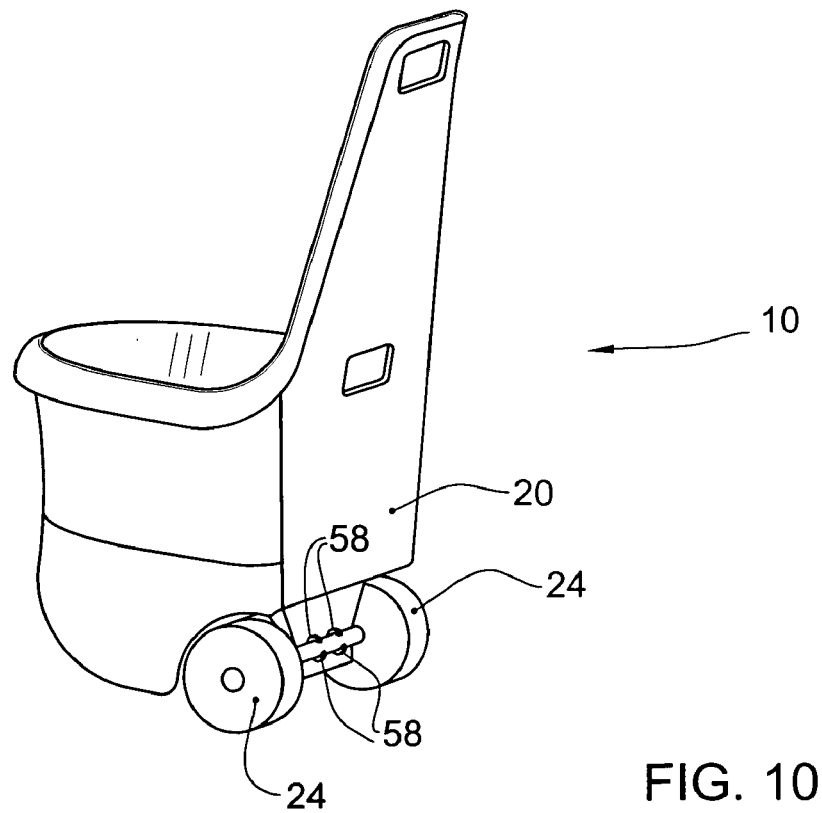
Figure 11:
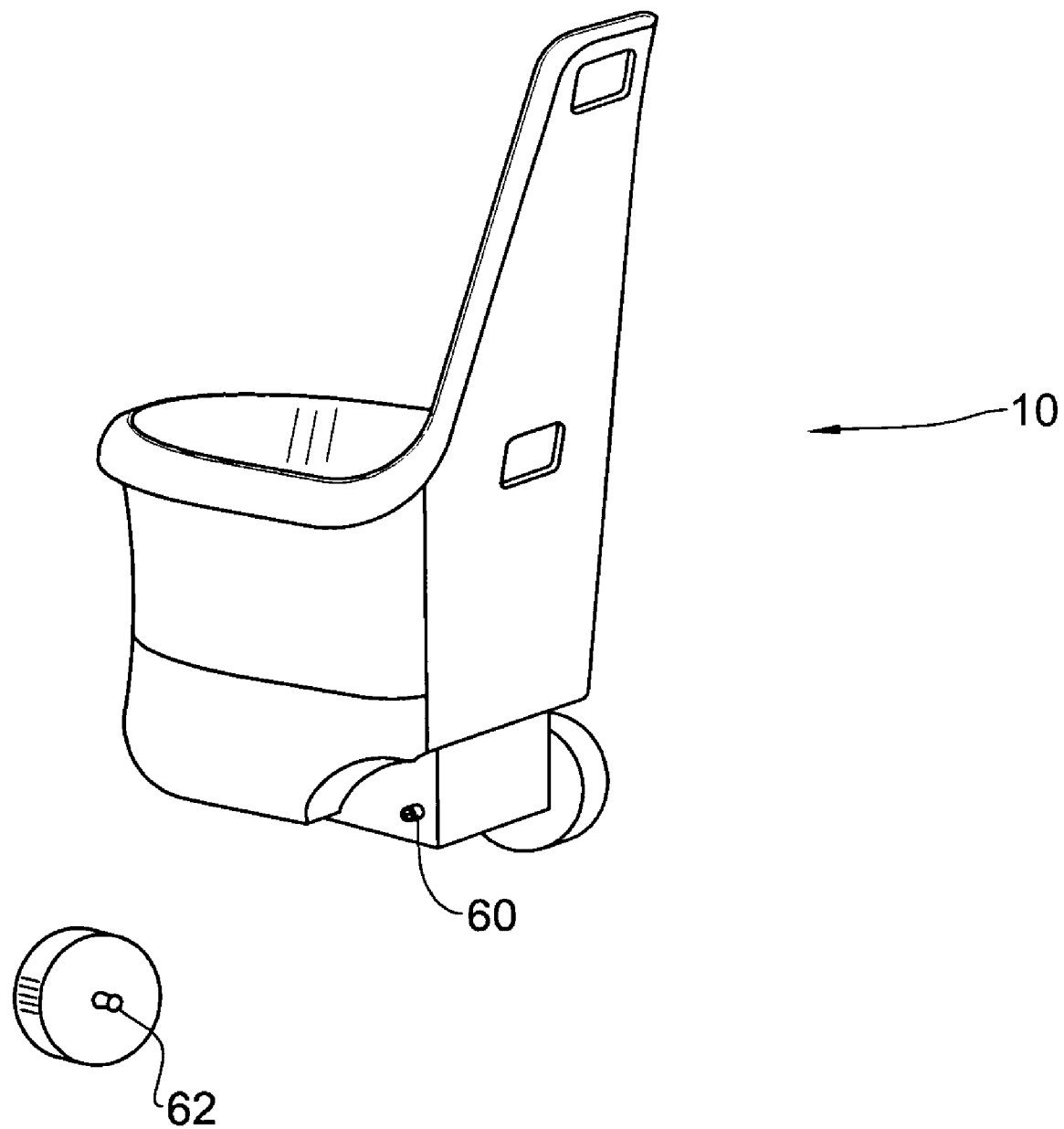

According to further modifications of the present invention, the wheels 24 may be connected to the bucket 10 in one of a variety of ways. FIGS. 8A and 8B illustrate one such modification, wherein the bucket 10 comprises a protrusion 50 formed as part of the back face 20 having a through passing aperture 52 adapted to receive the axle 54. FIG. 9 illustrates another of such modifications, wherein a groove 56, adapted to receive the axle, is formed in the back face. According to a further modification, illustrated in FIG. 10, there are provided grasping members 58, such as clips, incorporated into the back face 20, said grasping members being adapted to snappably receive the axle 54. According to a still further modification, the wheels 24 are connected directly to the bucket 10. This may be accomplished, as shown in FIG. 11 in exploded view, by providing a tubular extension 60 projecting from the bucket 10 and a complementary stem 62 extending from the inside of each wheel 24. According to this modification, the wheels 24 may turn independently of one another, facilitating sharp turns and rotation of the bucket 10 about a point between the wheels. According to any of these modifications, the wheels may be detachable. In this way, the size of the bucket may be minimized for storage and shipping.

Figure 12:
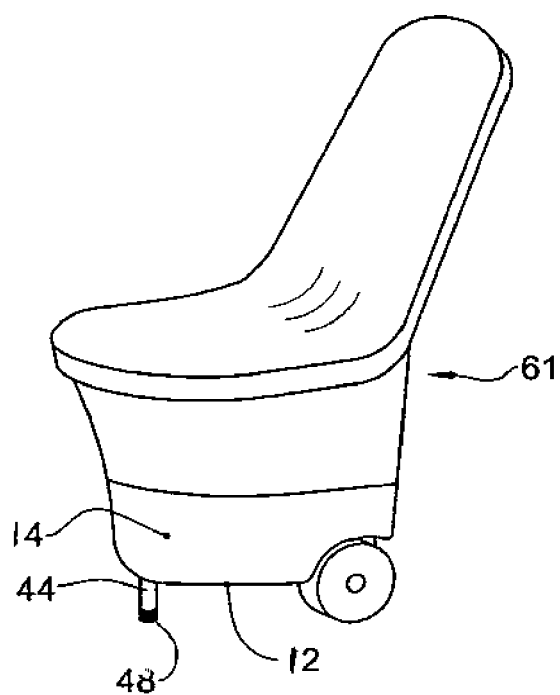
FIG. 12 is a perspective view of a still further embodiment of the bucket.

According to another embodiment, as shown in FIG. 12, there is provided at least one support foot 44, disposed on the bottom portion 12, opposite the wheels 24. In order not to adversely affect nesting, the support foot 44 should not extend beyond the vertical sidewalls 64, and as well should not extend downwardly substantially below the wheels 24 when the bottom portion 12 is parallel to the ground. Minimizing the length of the support foot 44 also minimizes the likelihood of the bucket 61 tipping. The foot may be formed as an integrated part of the bucket, or may be formed separately and attached thereto. If formed separately, the support foot 44 may be made from a viscoelastic material to prevent sliding on smooth surfaces. Alternatively, the support foot 44 may optionally comprise a pad 48, made from a viscoelastic material.

Figure 13:
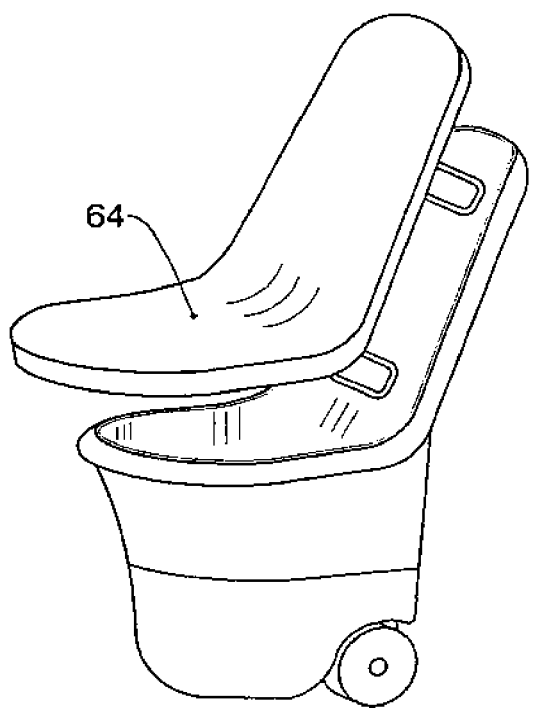
FIGS. 13 and 14 are perspective views of still further embodiments of the bucket, comprising covers according to several modifications.
Figure 14:
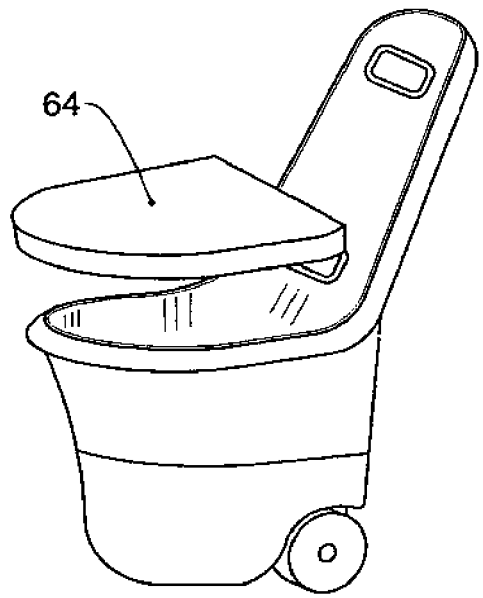

According to a further embodiment of the present invention, as seen in FIGS. 13 and 14, the bucket 10 may comprise a cover 64. The cover 64 may be made from the same material as the bucket 10, and may be designed with the same color pattern. The cover 64 may be adapted to conform to the shape of the entire rim 18 (FIG. 13), or only the top of the bucket interior (FIG. 14). The cover as shown in FIG. 13 may be provided with an opening in the center so that the bucket 10 may function as a portable toilet. The cover may also be formed being contoured to form a seat or a stool.

Figure 16:
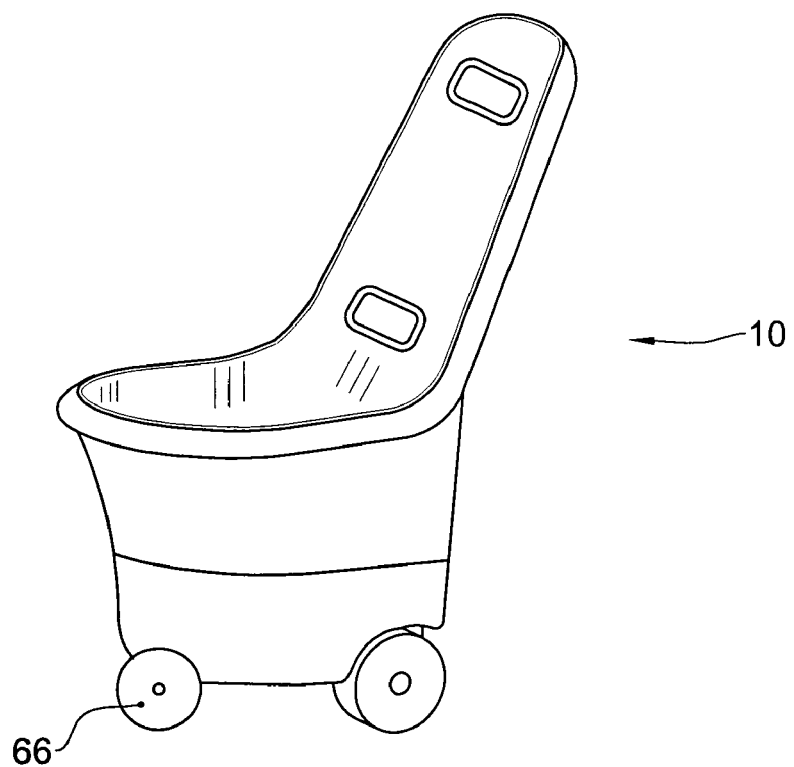
FIG. 16 is a perspective view of the bucket according to a still further embodiment of the present invention, comprising front wheels.

FIG. 16 illustrates a still further embodiment of the present invention, wherein the bucket 10 comprises an additional wheel or set of wheels 66 disposed at the front thereof. The wheels 66 may be attached via an axle, according to any of the modifications above, or they may be casters. Similar to the disclosure in connection with previous embodiments, the front wheels may be detachable.

Figure 17:
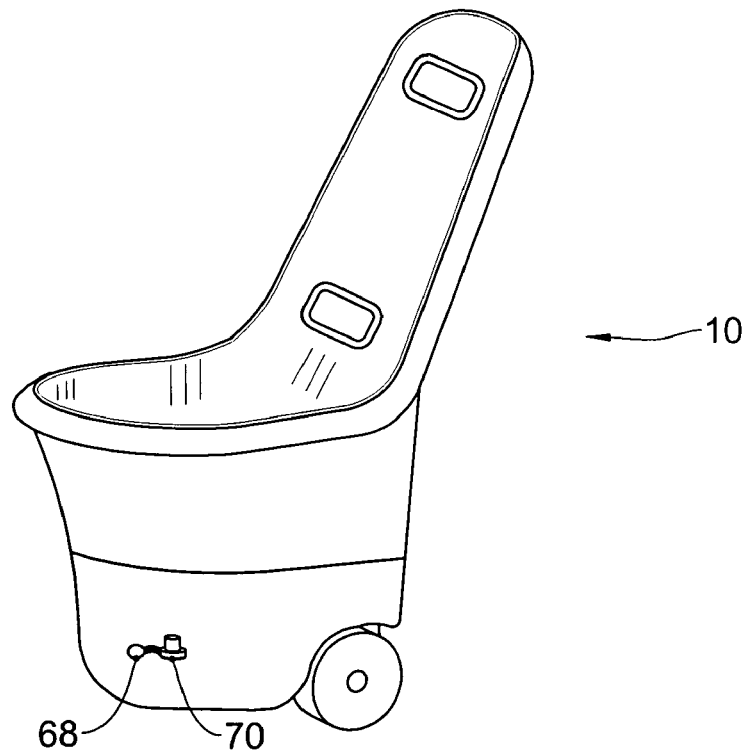
FIG. 17 is a perspective view of the bucket according to a still futher embodiment of the present invention, comprising a drainage arrangement.

FIG. 17 shows the bucket 10 according to a still further embodiment of the present invention, further comprising an aperture 68 disposed at or near the bottom thereof, and a complementary stopper 70. The aperture 68 is useful for drainage of liquid from the bucket 10 in a controlled manner. It should be noted that the stopper 70 may be any stopper known in the art, and may be located either externally to the bucket 10 (as shown) on internally thereto.

Figure 18:
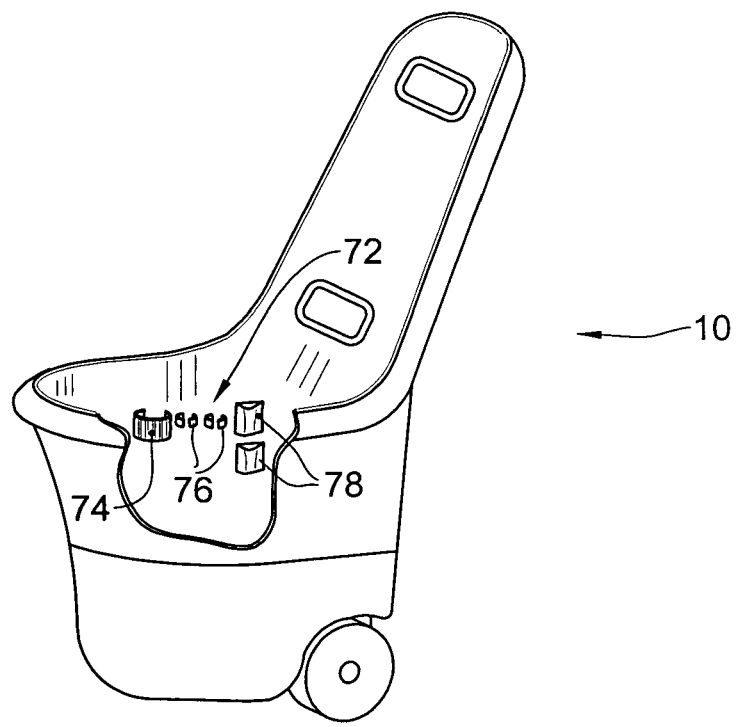
FIG. 18 is a partial cutaway perspective view of the bucket according to a still further embodiment of the present invention, comprising an arrangement useful for carrying various tools.

FIG. 18 illustrates the bucket 10 according to a further modification of the present invention, wherein it further comprises an arrangement 72 adapted to grip or store hand tools. The arrangement may include one or more loops 74 for a hammer, and different sizes clips 76 for gripping a variety of tools. It may also include compartments 78 for storage therein of small hardware. Although the arrangement is shown in FIG. 18 as being disposed on the interior of the bucket, it should be obvious to one versed in the art to place in exterior thereto. As an additional option, some or each of the compartments 78 may be accessible from both the interior and the exterior of the bucket 10.

Figure 15:
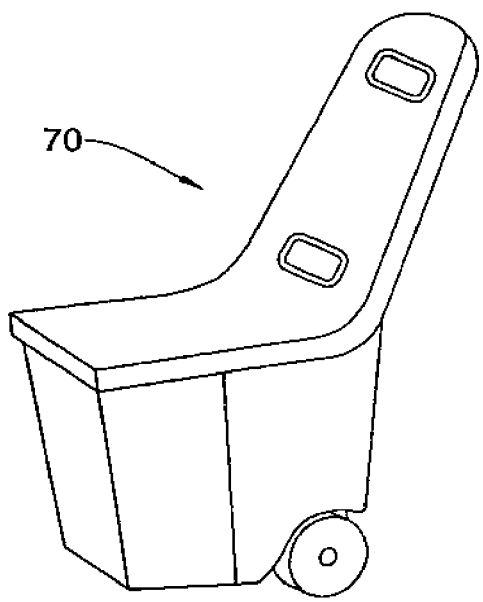
FIG. 15 is a perspective view of the bucket according to a still further embodiment of the present invention.
Figure 19:
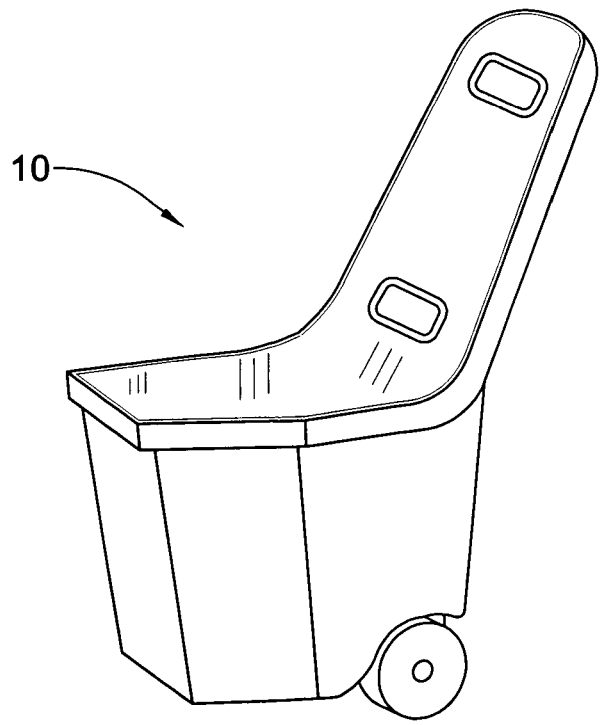
FIG. 19 is a perspective view of the bucket according to a still further embodiment of the present invention.

The shape of the bucket is not limited to the ones illustrated in the figures henceforth. Other embodiments of the shape of the bucket 70, such as a square (as in FIG. 15) or a hexagon (as on FIG. 19) are possible. In addition, the bucket 10 may be provided in different sizes for different applications.

Figure 20A:
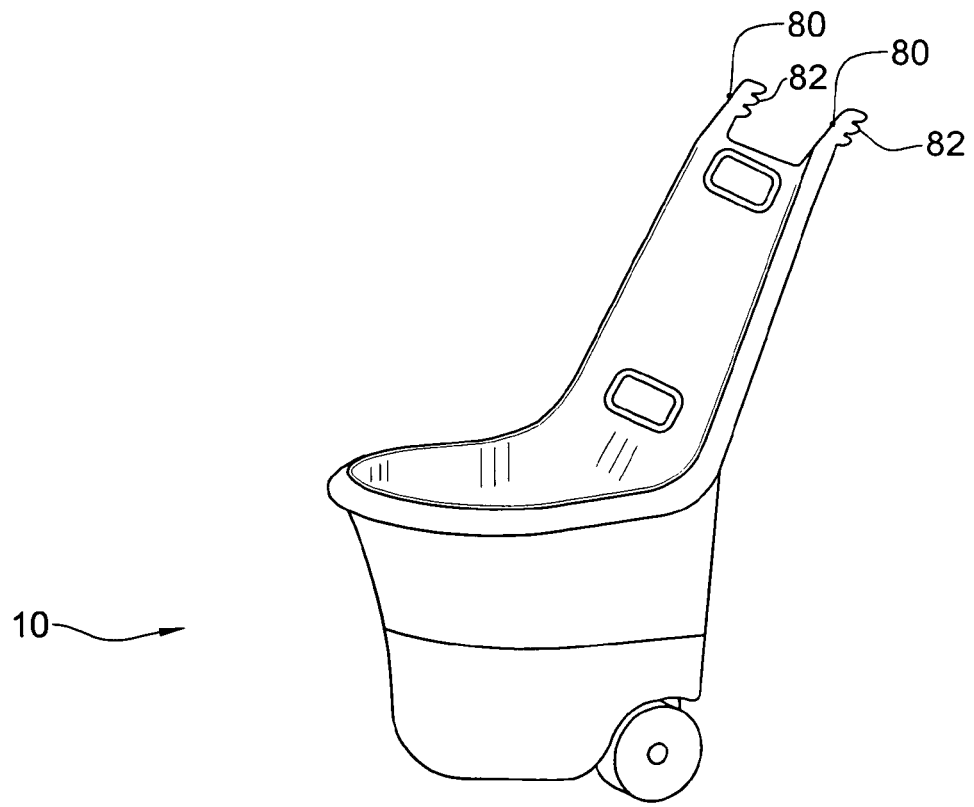
FIGS. 20A and 20B are perspective views of the bucket according to a still further embodiment of the present invention, comprising auxiliary handles.
Figure 20B:
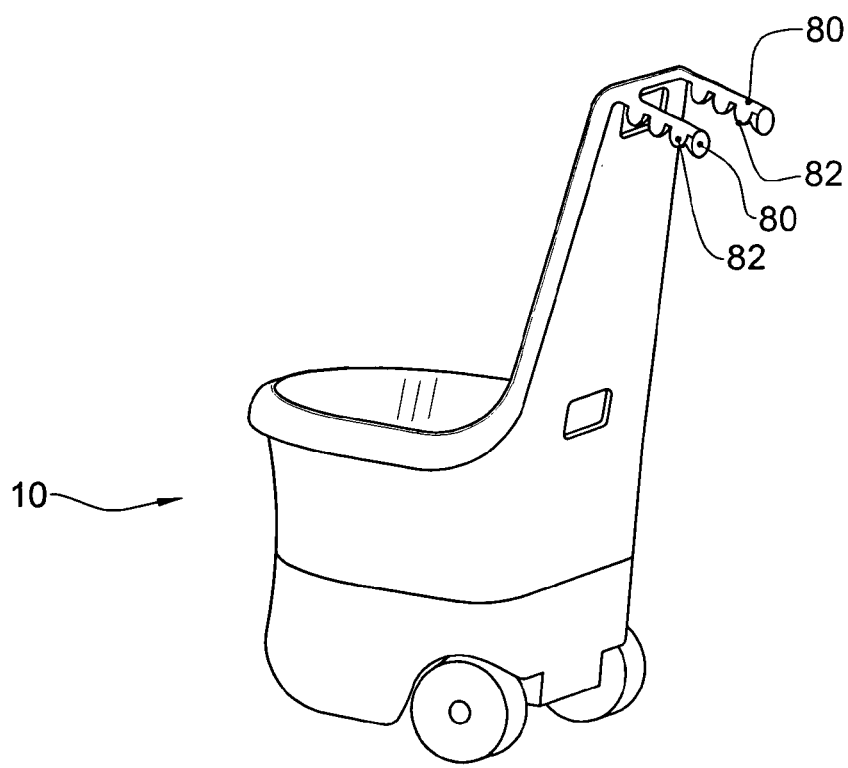

FIGS. 20A and 20B illustrate a further embodiment of the bucket 10, further comprising auxiliary handles 80. The auxiliary handles 80 may project upwardly (as in FIG. 20A) or toward the back of the bucket 10 (as seen in FIG. 20B). The auxiliary handles 80 may optionally comprise finger ridges 82 in order to maintain a firm grip thereon.

Those skilled in the art to which this invention pertains will readily appreciate that numerous changes, variations and modifications can be made without departing from the scope of the invention *mutatis mutandis*.

The invention claimed is:

1. A wheeled bucket, comprising:
   an integrally formed bucket, comprising:
      a bottom portion; and
      a bucket interior formed by substantially vertical walls, wherein the substantially vertical walls are defined by at least two sidewalls, a back face, and a front face, and wherein the bottom portion positioned proximate the front face faces substantially downward;
   an upwardly extending portion having a fixed height, wherein the upwardly extending portion integrally extends from at least the back face of the integrally formed bucket so as to terminate substantially above a height of the integrally formed bucket, and wherein a width of the upwardly extending portion is less than a diameter of the bucket interior formed by the substantially vertical walls;
   an upper rim, which is a downwardly curved extension of at least a portion of a top of the sidewalls, the upper rim constituting a hand grip configured to allow for a hand-holding of the wheeled bucket at the upper rim by a user; and
   at least two wheels mounted at the bottom portion of the integrally formed bucket about an axis, wherein the at least two wheels are positioned proximate to a bottom area of the back face, wherein the at least two mounted wheels are substantially located within recesses in the bottom portion of the integrally formed bucket, and wherein the positioning of the at least two wheels on the integrally formed bucket are configured so that, when the wheeled bucket is in a generally upright, freestanding position, the at least two wheels engage a ground surface so as to support the wheeled bucket,
   wherein the integrally formed bucket is configured for nested stacking, in the generally upright, freestanding position, of a second wheeled bucket that is substantially similar to the wheeled bucket, wherein the nested stacking occurs within the bucket interior, and
   wherein the wheeled bucket is configured to enable the user to incline the upwardly extending portion so as to tilt the wheeled bucket from (a) the generally upright, freestanding position to (b) a tilted rolling movement position, wherein the wheeled bucket is rollingly supported by the at least two wheels and the upwardly extending portion engaged by the user, thereby enabling the user to roll the wheeled bucket by pushing or pulling the upwardly extending portion of the wheeled bucket in a desired direction.

2. The wheeled bucket according to claim 1, wherein the wheeled bucket is adapted to pivot about the axis between a first position and a second position, the wheeled bucket in the first position is disposed so that the bottom portion faces downward, and the wheeled bucket in the second position is disposed so that the upwardly extending portion of the wheeled bucket faces downward, and a top edge of the upwardly extending portion of the wheeled bucket is configured to allow for, while the wheeled bucket is in the second position, a sliding transfer of articles from the ground to the bucket interior via the upwardly extending portion of the wheeled bucket.

3. The wheeled bucket according to claim 1, wherein side edges of the upwardly extending portion of the wheeled bucket follow, at least partially, a contour of the substantially vertical walls of the bucket interior of the integrally formed bucket.

4. The wheeled bucket according to claim 2, wherein the wheeled bucket further comprises an arrangement adapted to serve as at least one support point when the wheeled bucket is in the second position.

5. The wheeled bucket according to claim 2, wherein at least a substantial portion of the upwardly extending portion of the wheeled bucket, when the wheeled bucket is in the second position, is substantially flush with the ground.

6. The wheeled bucket according to claim 4, wherein the the at least two wheels constitute the arrangement.

* * * * *